United States Patent
Katzman et al.

(10) Patent No.: US 7,121,931 B2
(45) Date of Patent: Oct. 17, 2006

(54) LENS PRODUCTION METHOD AND PROCESS

(75) Inventors: Oded Katzman, Haifa (IL); Youval Katzman, Yaacov (IL)

(73) Assignee: KTI Technologies Ltd., Haifa (IL)

( * ) Notice: Subject to any disclaimer, the term of this patent is extended or adjusted under 35 U.S.C. 154(b) by 0 days.

(21) Appl. No.: 10/755,665

(22) Filed: Jan. 13, 2004

(65) Prior Publication Data

US 2004/0166784 A1    Aug. 26, 2004

Related U.S. Application Data

(63) Continuation-in-part of application No. 10/693,665, filed on Oct. 27, 2003.

(30) Foreign Application Priority Data

Nov. 14, 2002  (IL) ...................................... 152834
Jan. 23, 2003   (IL) ................................... 152834/2

(51) Int. Cl.
   *B24B 1/00* (2006.01)
(52) U.S. Cl. ............................ 451/57; 451/42; 451/43; 451/44

(58) Field of Classification Search .................. 451/42, 451/43, 44, 53, 63, 255–256, 277, 323, 325, 451/240, 390, 57; 15/214; 65/37; 351/177; 359/819
See application file for complete search history.

(56) References Cited

U.S. PATENT DOCUMENTS

| | | | | |
|---|---|---|---|---|
| 4,084,458 A | * | 4/1978 | Galley | 82/1.11 |
| 4,468,890 A | * | 9/1984 | Nagaura | 451/65 |
| 4,619,082 A | * | 10/1986 | Dent et al. | 451/42 |
| 4,686,798 A | * | 8/1987 | Petty et al. | 451/42 |
| 4,856,234 A | * | 8/1989 | Goins | 451/42 |
| 5,205,576 A | * | 4/1993 | Bogner et al. | 280/629 |
| 5,474,489 A | * | 12/1995 | Vernon | 451/42 |
| 5,972,251 A | * | 10/1999 | Shannon | 264/1.7 |
| 6,641,466 B1 | * | 11/2003 | Wallendorf et al. | 451/285 |
| 6,749,377 B1 | * | 6/2004 | Gottschald et al. | 409/132 |

* cited by examiner

*Primary Examiner*—George Nguyen
(74) *Attorney, Agent, or Firm*—Nath & Associates PLLC; Gregory B. Kang; Derek Richmond

(57) ABSTRACT

A method for processing a first optical face and a second optical face of a lens, where a lens blank is positioned and gripped by a gripping device relying on reference datum indications rendering it possible to obtain topographic orientation for processing both faces of the lens, and wherein not more then one reference datum indication extends on a face of the lens.

28 Claims, 10 Drawing Sheets

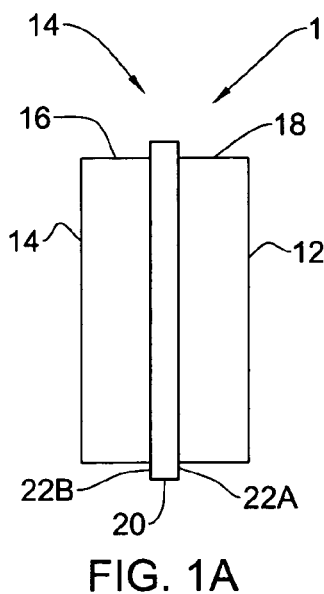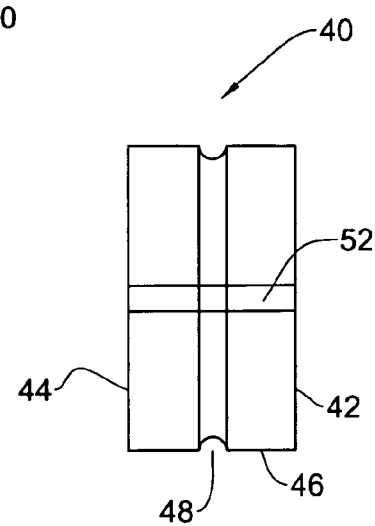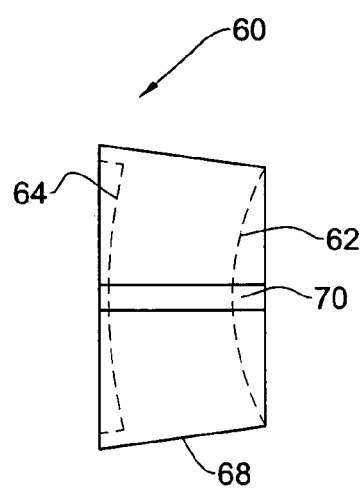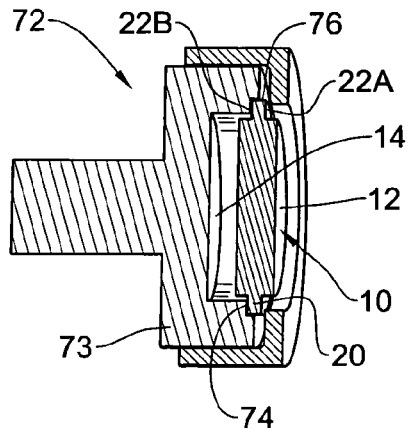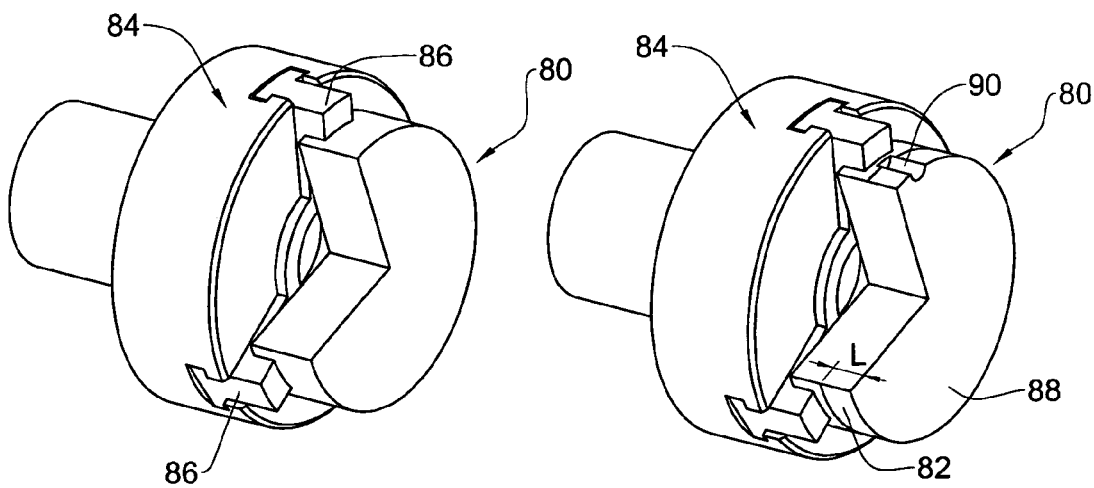

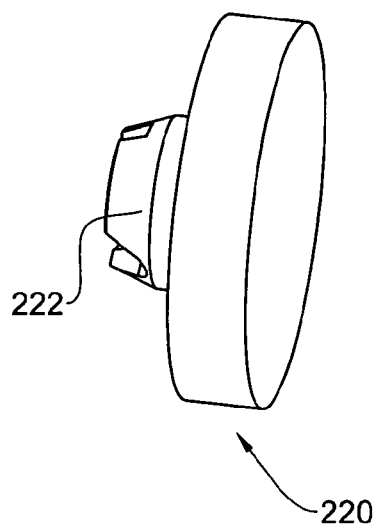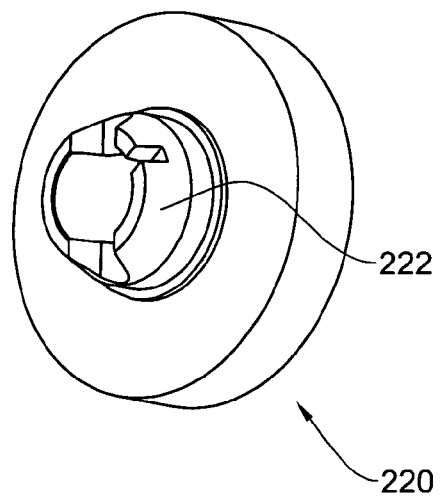
FIG. 6A   FIG. 6B
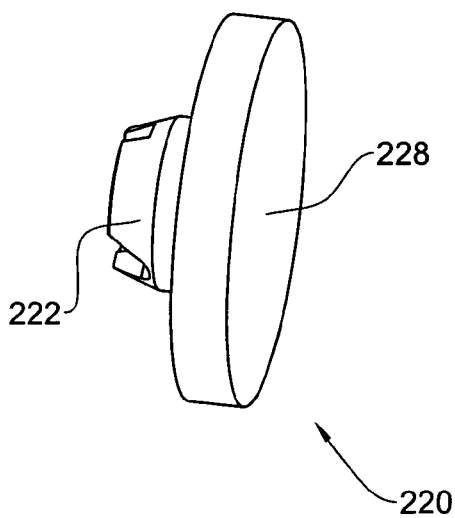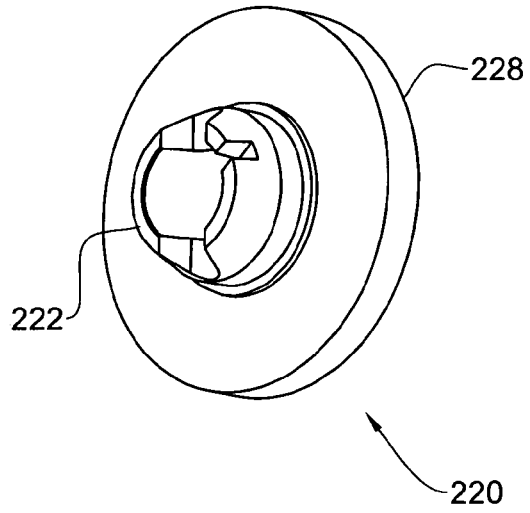
FIG. 6C   FIG. 6D

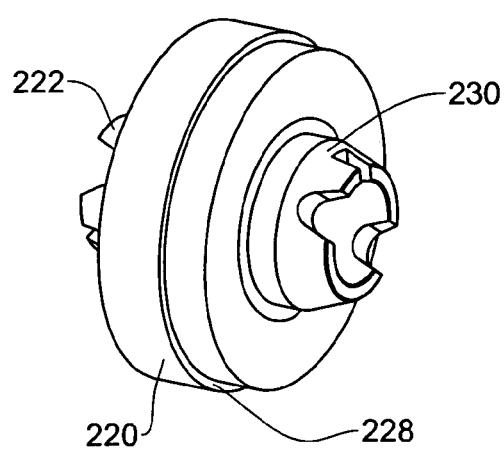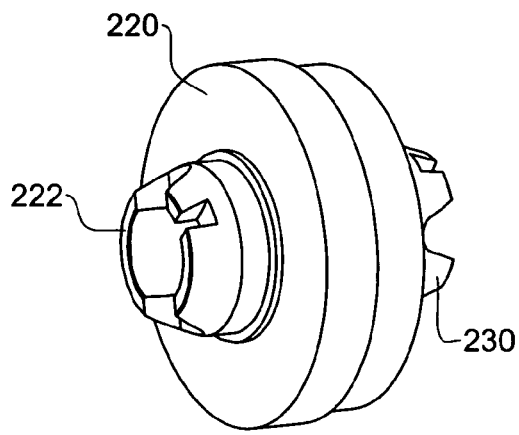
FIG. 6E  FIG. 6F
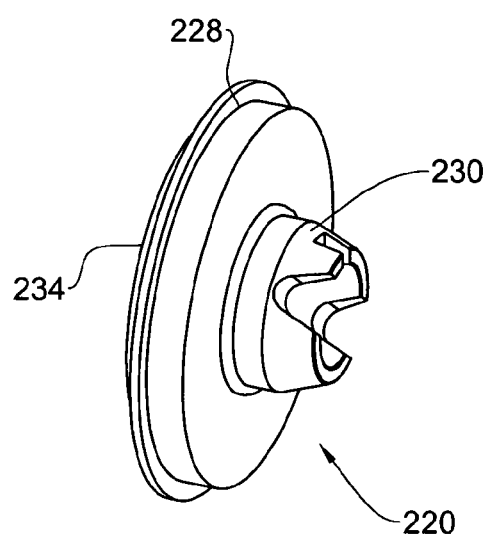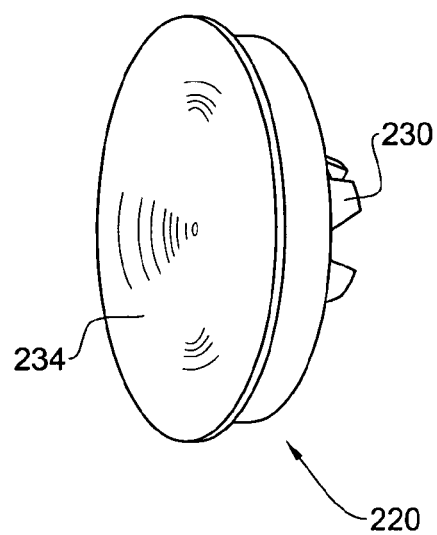
FIG. 6G  FIG. 6H

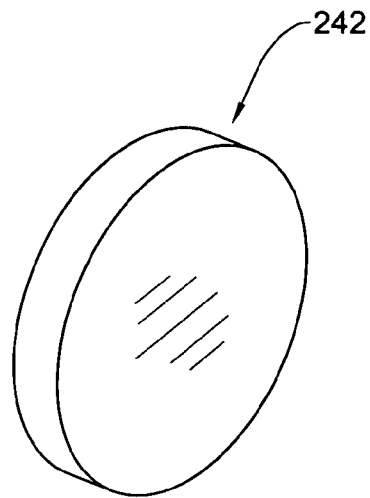
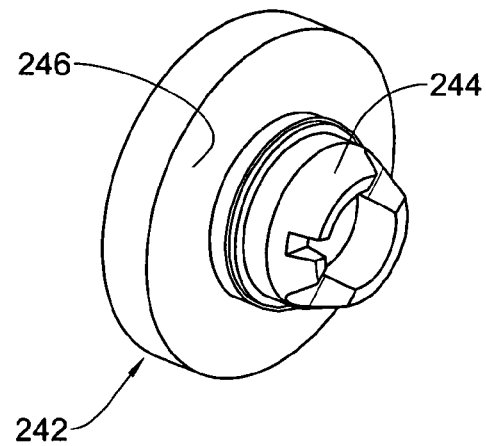
FIG. 7A         FIG. 7B
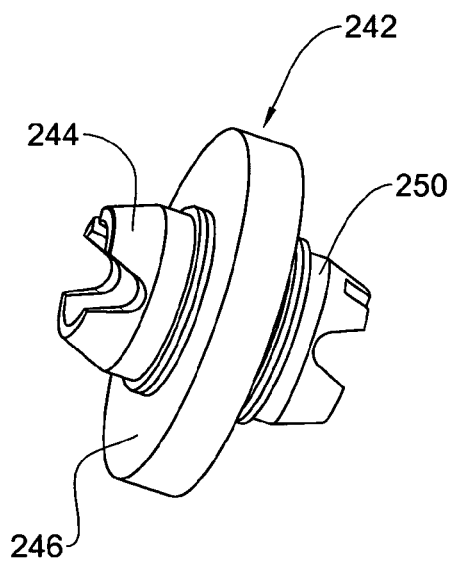
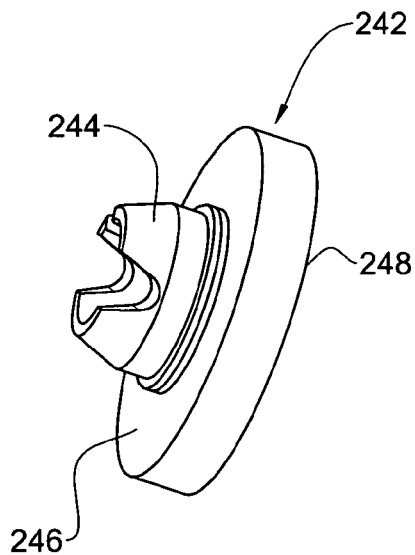
FIG. 7C         FIG. 7D

LENS PRODUCTION METHOD AND PROCESS

This is a Continuation-In-Part of U.S. patent application Ser. No. 10/693,665 filed on Oct. 27, 2003, the entire contents of which are hereby incorporated by reference in its entirety, and claims priority to Israel Application No. 152834 as amended on Jan. 23, 2003.

FIELD OF THE INVENTION

This invention relates to a method and a process for manufacturing an optical lens. In particular the invention is concerned with gripping the blank during the process of forming the topography of the optical faces of the lens.

The term blank or lens blank as used herein in the specification and claims, denotes a work-piece from which the lens is manufactured according to any forming process.

BACKGROUND OF THE INVENTION

Each optical lens comprises two optical surfaces, each formed with some physical characteristics (lens topography), the combined effect of these two surfaces when positioned relative to each other impart the lens with a desired optical performance. These characteristics fall in two categories:
  A. Surface quality, of both optical surfaces, affecting the ability of the surface to be transparent to light.
  B. Surface topography, of both optical surfaces, influencing the direction of the light as it passes through the lens.

These characteristics are obtained by different process by which the surfaces of the lens are formed, by different means and at different processes, as known in the art.

The surface topography is achieved by one or more of processes such as grinding, cutting, machining, molding, etc. The surface quality is achieved by processes such as smoothing, lapping and polishing. These and other procedures for obtaining the lens surface are referred to herein the specifications and claims as processing.

According to any of the processes mentioned above and as known in the art, the lens blank has to be firmly griped in the respective machine while the surface is being processed.

A common practice in the optical industry, for holding a lens blank during process, is to adhere the lens to a so-called blocking element, also referred to as a 'blocker' or a 'blocking chuck'. The blocker is attached to the lens at the surface not being processed.

The blocker is made of a hard material such as Aluminum or stainless steel and usually has a typical and standard shape that provides for easy attachment of the blocker to conventional gripping means of the machine while the lens is adhered to it, such that the lens blank can be easily and safely processed by the machine tools.

The process of adhering (attaching) the blocker to the lens or lens blank is referred to in the art as blocking. The terms blocking, attaching and adhering are interchangeably used herein the specification and claims. The hard blocking material may damage the surface of the already formed lens surface. In some cases adherence of the blocker to the lens may be insufficiently strong. In order to ensure strong and safe attaching of the blocker to the lens, some preparations are needed.

One commonly used method of protecting the lens surface is by applying a protective tape (also known as surface saver) over the lens. This tape is a plastic tape with an adhesive face for adhering to the lens by a dedicated taping system ('surface saver applicator'), and the blocker is attached to the other face of the tape.

Another method of protecting the lens is by applying on to the lens a material that dries and hardens and remain as a coating layer on the lens surface. Such a material may be applied for example by spraying.

However, the surface of the lens must be clean prior to taping or spraying and therefore requires some particular care and attention during the process. For that purpose, in some lens production lines, a cleaning step is introduced prior to protecting step.

The first step in blocking the lens is precisely positioning the blocker with respect to the lens. In some cases, the position of the lens with respect to the blocker is critical. Mispositioning of the lens on the blocker may lead to poor optical performance of the final lens. In order to ensure an accurate positioning of the lens on the blocker, an enlarging imaging device is used whereby the operator views the lens and moves the lens over the blocker, until premarked reference marks on the lens surface appear in a predetermined position.

According to one process, the operator is required to position the lens such that a point printed at the geometrical center of the lens appears at the center of the lens blocker. A printing machine is used for printing the reference mark and in most cases printing takes place prior to protecting by tape or spray. Once the operator confirms that the lens is in the right position, a temporary clamping device is used to make sure the lens doesn't move during the next step.

The adhering material used for attaching the lens to the blocker is, by one form, a special alloy known as "Wood Alloy". This alloy melts at low temperature to ensure minimum risk for damaging the lens. Typically the melting temperature is in the range of about 47° C. to 85° C. Alternatively, a special wax is used for that purpose.

A typical blocking system comprises a hot reservoir of melted alloy or wax, a mechanical system to hold the blocker, a vision or imaging system for viewing the lens and the reference marks at large scale. During the blocking process, when the operator confirms that the lens is properly positioned with respect to the blocker, the alloy is pumped to fill the gap between the blocker and the lens.

Once the alloy or wax cools, it hardens such that the lens and the blocker are rigidly attached to one another, and now the other face of the lens may be formed.

The process disclosed above requires several steps which is time consuming and where accuracy is dependant up to great extent on the skills of the operator and on his vision, which is a differing and un-reliable parameter.

SUMMARY OF THE INVENTION

The present invention, according to its broad aspect, calls for a process and method for manufacturing a two-faced lens, wherein during manufacture full-spatial orientation is obtained without relying on reference datum related with an optical face of the lens.

According to a a first aspect of the invention there is provided a method for processing both optical faces of a lens, where gripping and orientating the lens with respect to griping means of a lens processing equipment is carried out by relying on full-spatial orientation (three-dimensional) reference datum indications such that throughout the lens manufacturing process not more then one reference datum indication extends on an optical surface of the lens, to obtain true position of the lens. According to some particular embodiments, all reference datum indications are formed out of the optical face of the lens, i.e. all said reference datum indications are formed on peripheral portions of the lens.

The terms true position and full register denote positioning and orientation of an object with respect to another object or geometric location, at an unequivocal position. Typically such positioning is facilitated by mechanical reference datum indications.

By its broad aspect, the invention calls for manufacturing the optical faces of a lens where gripping and processing are carried out while a lens blank is gripped at peripheral surfaces thereof.

According to one particular embodiment, there is provided a method for processing optical faces of a lens wherein gripping a lens blank during processing optical faces of the lens is carried out by gripping the blank at portions of the blank having a radius greater than that of the processed optical faces.

A lens blank processed according to a method of the present invention is mechanically gripped to thereby constitute at least part of the full-spatial orientation reference datum. At times, further indicia may be imparted to the lens for optically setting. Optical setting denotes relying on optical parameters for true positioning of the lens blank, where man or machine vision is required.

The method according to an embodiment of the present invention comprises the following steps:

Obtaining a lens blank;

Gripping the lens blank by a gripping device for use in conjunction with a lens production machine;

At the same grip, processing the lens blank to obtain a full-spatial reference datum indications and processing a first optical face of the lens whereby said reference datum indications define the coordinates of the lens with respect to said first optical face; and wherein not more than one reference datum indication extends on an optical surface of the lens;

Turning over the lens blank and gripping it while relying on said reference datum indications; and Processing a second optical face of the lens.

The gripping device, as referred to herein after in the specification and claims, may be integral with the lens production machine or detachably fixable thereto.

According to a first modification of the first embodiment of the invention, after processing the first optical face of the lens, a removable structural support material is molded into a cavity formed at said first optical face, to thereby hold/support, reinforce and increase rigidity of the lens during processing the second lens face. Preferably, some anchoring means are formed at a front side of the partially processed lens, such as a peripheral recess or indentations, to increase attachment of the structural support material to the lens. Still preferably, the finished surface of the first optical face is coated with a protective material prior to applying the structural support material. Other finishing processes may also be carried out at that stage.

The term finishing, as used herein the specification and claims denotes final process applied to the optical face of the lens, after completing its topography, such as different polishing methods, various coatings and treatings etc.

When a structural support material has been applied to the first optical face, and upon completing processing the second lens face, the optical geometry of the lens is complete upon removing excessive peripheral portions and it may then be removed from the support material.

A method according to a second modification of the first embodiment of the present invention comprises the following steps:

Obtaining a lens blank;

Gripping the lens blank by a gripping device used in conjunction with a lens production machine;

Processing the lens blank to obtain a full-spatial reference datum indications and processing a first optical face of the lens, whereby said reference datum indications define the coordinates of the lens with respect to said first optical face; not more then one reference datum indication extends on an optical surface of the lens;

Blocking the first optical face of the lens to a blocking chuck, where reference datum of the blocking chuck is in register with the reference datum of the lens blank;

Gripping the blocking chuck by a gripping device of a lens production machine; and Processing a second optical face of the lens.

According to another aspect of the invention, there is provided a lens blank pre-formed with full-spatial reference datum indications, whereby the blank may than be gripped by a gripping device for use in conjunction with a lens processing machine, relying on said reference datum indicia, for processing both optical faces of the lens. The coordinates determined by the reference datum indications provide spatial information corresponding with the complexity of the lens concerned. However, not more then one reference datum indication extends on an optical surface of the lens and according to some embodiments, all reference datum indications extend out of the optical face of lens. It is however appreciated that the lens blank is pre-formed with all reference datum indications, or with at least one such reference datum indication, whereby further reference datum indications are formed on the lens blank as may be required, depending on the lens type and optical complexity.

Also, the lens blank may be partially pre-formed with one or both of the first and second optical face curvatures i.e. be pre-formed with some optical topography.

By a modification of the invention, the reference datum indications are provided by an adapter assembly wherein the lens blank is received by a first component adapted for engagement with a second component associated with the gripping device; wherein said first component and said second component are formed with corresponding reference datum engagement portions. The lens blank may be fixedly attached or molded within said first component, being for example an adapter ring.

According to a further aspect of the present invention, there is provided a method for processing both optical faces of a lens, where gripping and orientating the lens with respect to griping means of a lens processing equipment is carried out in full register over both faces of the lens, by relying on a chuck associated with each face of the lens. According with such embodiments, there is no need for providing or forming reference datum indications on peripheral portions of the lens. Said processing equipment being machining equipment.

By one particular application of the further embodiment of the invention, a lens blank is obtained integral with a chuck extending at one face thereof. A first face of the lens is processed whilst gripping the blank by said integral chuck and then an additional chuck is attached to said first face in full register with said integral chuck. By gripping the blank at said additional chuck, the integral chuck is machined away and further the second face of the lens is processed.

According to a second application of the further embodiment a simple lens blank is obtained and a first chuck is attached to a face of the blank, without care about precision. A first face of the lens is then processed (machined) whilst gripping the blank by said first chuck and then a second chuck is precisely attached (blocked) to said first face of the lens, in full register with said first chuck. The first chuck is then removed and the second face of the lens is machined whilst gripping the blank by said second chuck.

However, it is appreciated that according to the later embodiments, blocking the chucks in register with one another is carried out along with recordal of the kinematic parameters of the chucks, i.e. the absolute position of the chucks with respect to one another, to thereby facilitate further processing and machining of the lens e.g. by a CNC machine.

It is further to be noted that apart for processing the topography of the lens by machining, other forms of processing may take place at any stage of the processes according to the present invention. Such additional processes may be, for example, applying various marks to the lens (visible or non-visible marks), edging, polishing, coating, etc.

According to a further aspect of the present invention, there is provided an apparatus for chuck-to-chuck orientation while blocking (attaching) a second chuck to a lens blank in full register with a first chuck fixed to the lens blank. The apparatus, according to one particular embodiment, is fitted with a first chuck gripper and a second chuck gripper where at least one of said grippers is axially displaceable along an axis parallel to an axis extending between said chuck grippers, to thereby obtain full register between the chucks. According to a modification thereof, said chuck grippers are axially aligned and according to still a modification, at least one of the grippers is tiltable about said axis, or rotatable.

Such an apparatus is preferably fitted with arrangements for recordal of the kinematic parameters of the chucks, i.e. the absolute position of the chucks with respect to one another, preferably digital such arrangements, to thereby facilitate further processing and machining of the lens e.g. by a CNC machine.

BRIEF DESCRIPTION OF THE DRAWINGS

For better understanding the invention and to see how it may be carried out in practice, some embodiments will now be described, by way of some non-limiting examples only, with reference to the accompanying drawings, in which:

FIGS. 1A to 1C are side views of lens blanks according to several embodiments of the inventions;

FIG. 1D illustrates an example of gripping a lens blank as in FIG. 1A by a lens gripping device;

FIGS. 2A to 2G are isometric views illustrating consecutive steps in preparing a lens according to a method of the present invention, the lens being partially cutaway;

FIGS. 6A to 6H are isometric front and rear views illustrating consecutive steps in preparing a lens according to still another method of the present invention;

FIGS. 7A to 7D are isometric views illustrating consecutive steps in preparing a lens according to a different method of the present invention.

DETAILED DESCRIPTION OF THE INVENTION

Figure 2C:
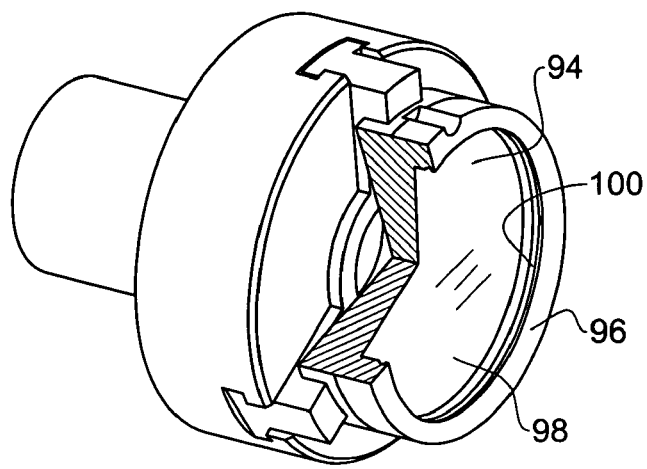
Figure 2D:
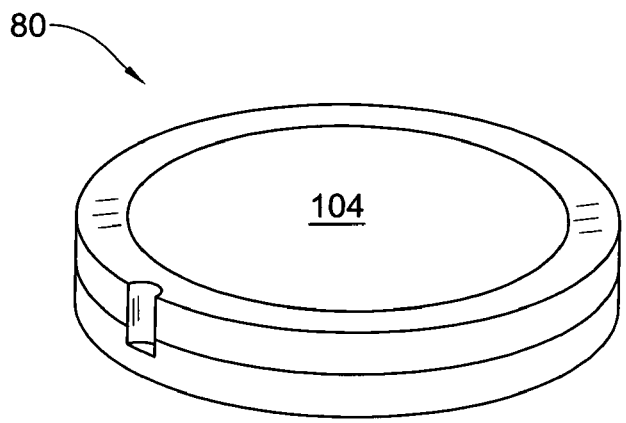
Figure 2E:
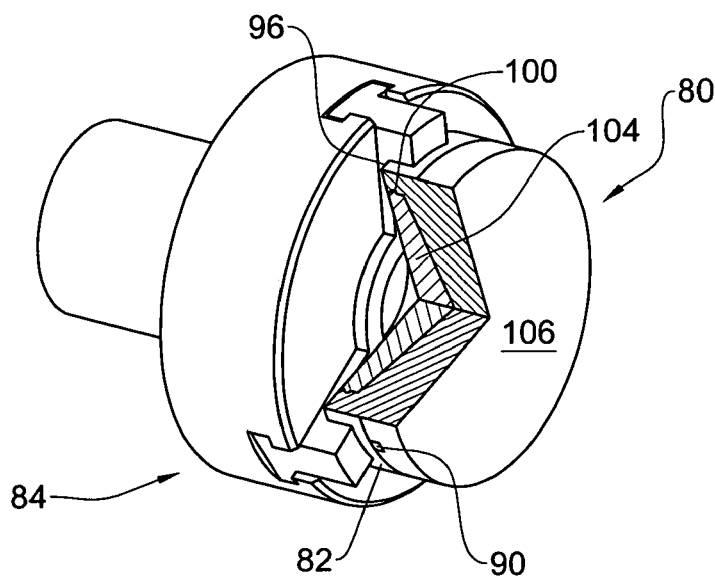

Attention is first directed to FIGS. 1A to 1C of the drawings illustrating several examples of lens blanks in accordance with the present invention. In FIG. 1A lens blank 10 is a highly translucent cylindrical body having a first face 12, a second face 14 and a peripheral portion comprising two generally cylindrical portions 16 and 18 separated from one another by an annular radially extending rim 20. Faces 12 and 14 are non-optical faces, i.e. are not formed with optical topography. Generally cylindrical face 16 and an annular, radially extending rim 20 serving as a reference datum.

Rim 20 comprises two shoulders 22A and 22B extending parallel to one another and at a right angle with respect to surface 16. Furthermore, the axial distance between the shoulders 22A and 22B is of known value.

The reference datum is indicative of the orientation of the lens blank 10 while gripped in a conventional machining chuck of a lens processing equipment such that the lens blank 10 is gripped at either of its portions 16 or 18 relying on said rim 20. In accordance with the embodiment of FIG. 1A a first optical lens face and a second optical lens face may be processed.

In the embodiment of FIG. 1B there is illustrated a lens blank generally designated 40 being an essentially cylindrical body formed with a first non-optical face 42, a second non-optical face 44 and a cylindrical peripheral face 46 separated by an annular groove 48 providing axial reference datum whilst an axially extending recess 52 provides for lens orientation in one axis. The combination of recesses 48 and 52 provides sufficient datum for processing the first and second optical lens surfaces (optical topography).

Turning now to the embodiment of FIG. 1C, there is illustrated still a different embodiment of a lens blank in accordance with the present invention generally designated 60 where the first optical lens face 62, illustrated by a dashed line, is roughly preformed and similarly, the second optical face 64, also illustrated by a dashed line, is roughly preformed. However, it is to be appreciated that the first and second faces 62 and 64, respectively may be already complete as far as their optical topography, or may be near to complete or only partially formed. The peripheral surface of the lens blank 60, designated at 68 is a tapering wall providing axial orientation for the lens blank with an axially extending recess 70 formed in the peripheral wall providing at least one degree of spatial reference datum for orientation of the lens.

A lens blank in accordance with the present embodiment comprises mechanical reference datum for determining the orientation of at least a first lens face whereupon after processing said first optical face, the second optical face may be processed with said first optical face further serving as different datum for processing the second optical face.

FIG. 1D is an example of how a lens blank 10, according to the embodiment of FIG. 1A is fixedly gripped by a gripping device generally designated 72 and comprising a base member 73 fitted with a neck portion 74 for gripping by a chuck of a machining apparatus (not shown) and a lens-blank bearing shoulder 75 for supporting shoulder 22B of the lens blank 10 (see FIG. 1A). A locking member 76 is suited for tightly and fixedly engaging the base member 73, e.g. by screw fastening, such that it bears against shoulder 22A of rim 20 of the lens blank, thus fixedly clamping it, whereby the lens blank nay be processed, e.g. by machining.

Whilst embodiments have been illustrated and exemplified in connection with a lens blank according to the present invention, it is to be appreciated that many other forms of such lens blanks may be formed, for use with a variety of lens gripping devices, without departing from the scope of the invention.

Turning now to FIGS. 2A through 2G, there is illustrated a first method for manufacturing a lens in accordance with the present invention. At a first step, a generally cylindrical lens blank 80 is obtained and is gripped by a conventional chuck generally designated 84 of a lathe (not shown). The lens blank 80 is secured to the chuck 84 by a plurality of radially displaceable chuck jaws 86 and where the lens blank 80 tightly bears against the jaws 86 eliminating axial and radial degrees of freedom.

At a first processing step (FIG. 2B) the lens blank 80 is precisely machined to form a circumferential cylindrical surface 82 coaxial with the axis of the chuck 84 and having a predetermined axial length L, measured from a first optical face 88 of the lens blank 80, which has been leveled to extend normal to the axis of the blank. Further, an axial recess 90 is formed on the periphery of the blank, aligned with the axial axis thereof. The cylindrical surface 82, the length L and the axial recess 90, constitute full-spatial orientation reference datum indications, whereby precise coordination of the lens is now available, providing complete orientation of the lens.

Once the mechanical reference datum 90 has been formed, the first optical face of the lens 94 is processed (machined), leaving a peripheral shoulder 96, thus forming a cavity designated 98. A radial peripheral undercut recess 100 is formed in the peripheral shoulder 96 (FIG. 2C), the purpose of which will become apparent with reference to the following Figures.

At a further step (FIG. 2D) a structural support material 104 in liquid form is molded, or otherwise applied, to the cavity 98 formed at the first optical face of the lens 80 and is allowed to harden and to solidify with the lens blank. The structural support material is, for example, a so-called wood alloy which is a material having a relatively low temperature (typically in the range of about 47° C. to 85° C.) or a special wax. Upon hardening, the structural support material 104 is well received within the cavity 98 and firmly received within recess 100 thereof, thereby allows for applying radial inwardly directed force for gripping the lens blank, as will become apparent with reference to FIGS. 2E–2G. Furthermore, the structural support material 104 reinforces and increases rigidity of the lens and reduces vibrations caused during the processing of the second optical face of the lens, upon axial progress of the machining/processing equipment and thinning of the lens.

Upon curing of the structural support material 104, the lens 80 is turned over and secured to the chuck 84 such that a second optical face 106 of the lens 80 is now facing upwards and is ready for being processed. However, gripping of the lens 80 within chuck 84 is carried out by relying on the already machined reference datum indications, namely the front face of the peripheral shoulder 96 (and the length L), the peripheral cylindrical surface 82 and the axial recess 90, for ensuring correct positioning of the lens 80 with respect to the chuck 84, such that the first and second optical faces of the lens are processed in correct orientation with respect to one another and with correct topography. This arrangement ensures correct orientation and coordination between both faces of the lens.

Figure 2F:
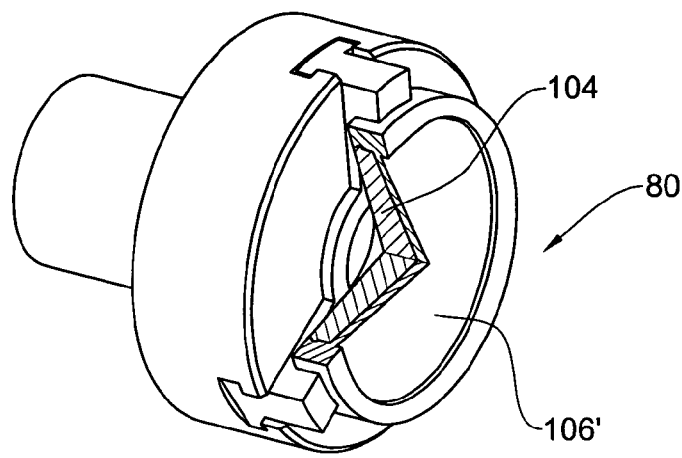
Figure 2G:
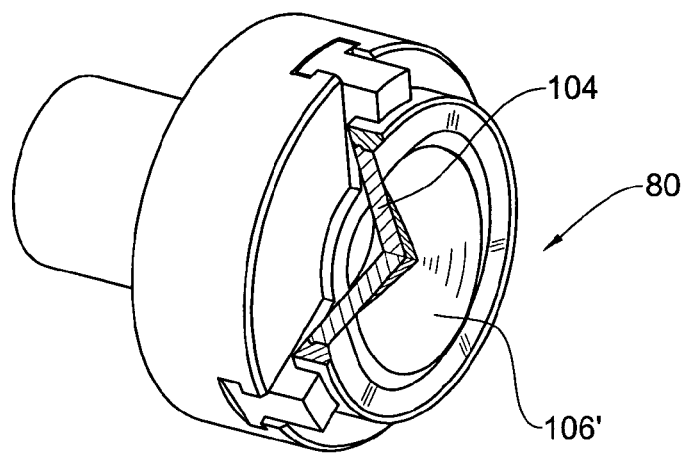
Figure 3:
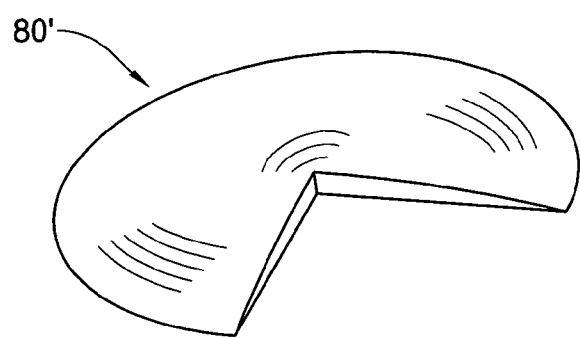
FIG. 3 is a cutaway isometric view of an optical lens.

In FIG. 2F, the lens 80 is illustrated in a position where the second lens face 106' is almost completed, whereas in FIG. 2G processing of the lens is complete where peripheral portions of the lens have been removed and where the finished lens 80' is secured by adhesion only by the structural support material 104. The lens 80', in its finished form, is seen in FIG. 3, after removing from the structural support material.

It is to be noted that in some cases, prior to applying the structural support material on the finished lens surface, it may be necessary to apply some protective coating to increase adhesion of the structural support material to the lens surface and to prevent damage to the lens surface.

Turning now to FIGS. 4A–4G, there is illustrated how a lens may be manufactured in accordance with a second method of the present invention. At a first step, a lens blank 128 is obtained and secured to a chuck 130. Lens blank 128 is of any form and shape, i.e. not necessarily preformed with any surface datum. Once the blank is securely received within the chuck 130, a first machining/processing step takes place where the front lens surface 134 is leveled (FIG. 4B) thereby constituting a first reference datum indication surface and then a circumferential cylindrical surface 136 is processed, having a thickness T and forming an annular shoulder S to provide for a rotational datum indication, an axial recess 140 is machined on the peripheral surface 136, all as similar to the embodiment as illustrated in FIG. 2B. The above surfaces constitute full-spatial orientation reference datum indications, whereby precise coordinations and orientation of the lens are now available.

Then, the first optical face 142 of the lens is finalized (FIG. 4C) and the lens blank 128 is removed from the chuck 130. However, in some cases the optical topography of the first optical face may be completed, whereas final finishing (e.g. polishing, coating, etc) is carried out after completing the topography of the second optical face. A blocker chuck 150 is then attached to the first surface 142 of the lens blank 128, typically by applying some protective tape (surface saver), to thereby protect the lens surface on the one hand, and, on the other hand, to increase adhesion of the blocker chuck to the lens.

The blocker chuck 150 is a metallic article formed with reference datum indications, e.g. chuck-engaging recesses 154, accurately machined cylindrical surface 156 and the overall height H of the chuck portion of the blocker chuck 150 which together constitute full-spatial orientation reference datum indications, whereby precise co-ordinations and full orientation of the lens are available. It is however appreciated that the blocker chuck 150 is attached to the lens blank 128 at true-position relation ensuring that the reference datum indications of the blocker chuck 150 is in register with the reference datum indications performed (machined) on the lens blank 128, as explained in connection with FIG. 4B.

Figure 4A:
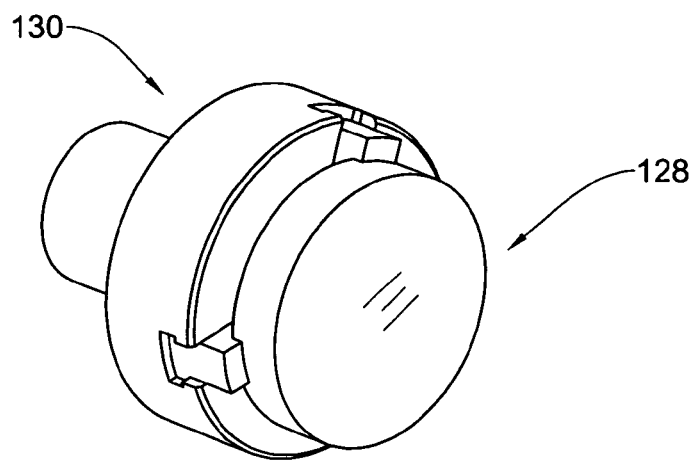
FIGS. 4A to 4F are isometric views illustrating consecutive steps in preparing a lens according to another method of the present invention.
Figure 4B:
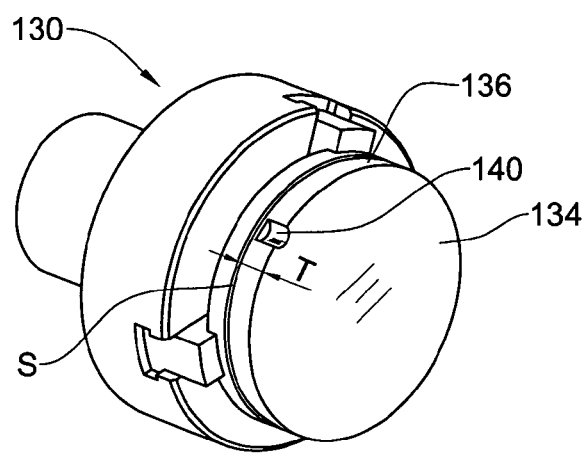
Figure 4C:
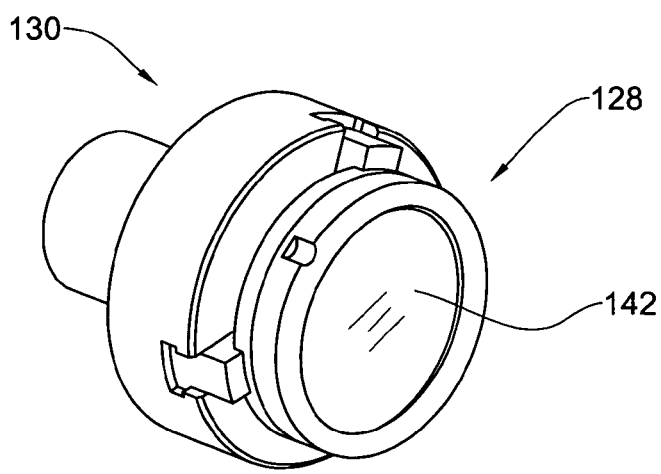
Figure 4D:
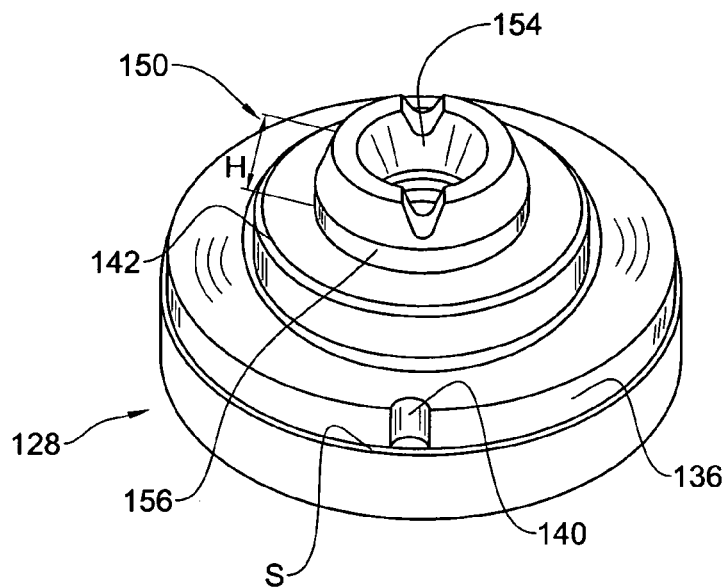
Figure 4E:
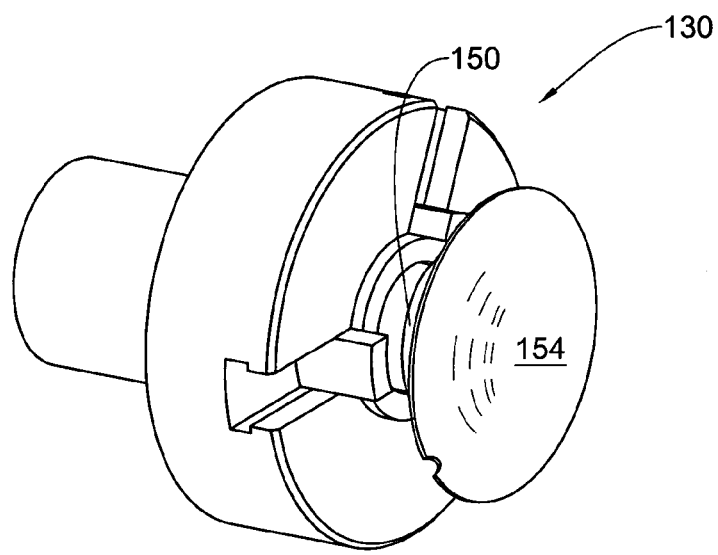
Figure 4F:
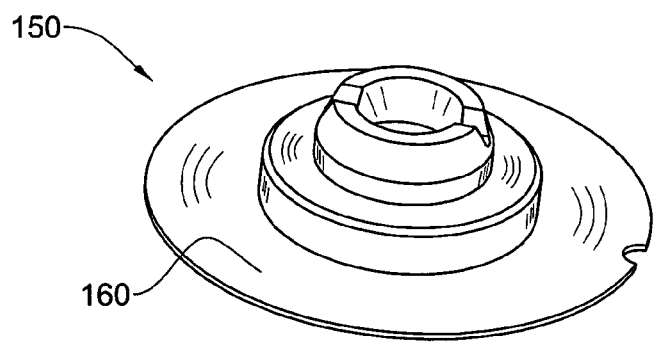

The assembled lens blank and blocker chuck are then attached to the chuck 130 in a tight manner and relying on the reference datum indications of the blocker chuck 150, whereby the second surface of the blank 154 is machined (FIG. 4E). Upon completing the second lens surface 154 the blocker 150 may be removed from the chuck (FIG. 4F) though a peripheral residual portion 160 is still to be removed prior to obtaining a final lens as illustrated in FIG. 3.

Figure 5A:
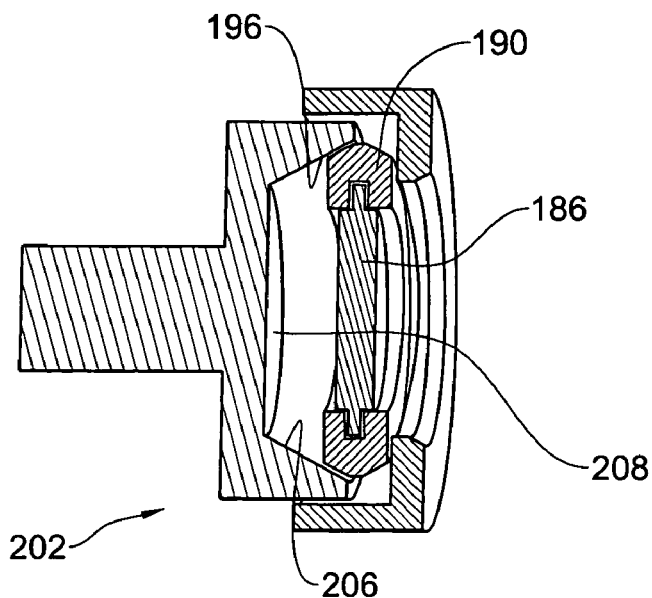
FIG. 5A is a cutaway of a subassembly illustrating a lens blank fixedly received by an adapter used in conjunction with a gripping device.
Figure 5B:
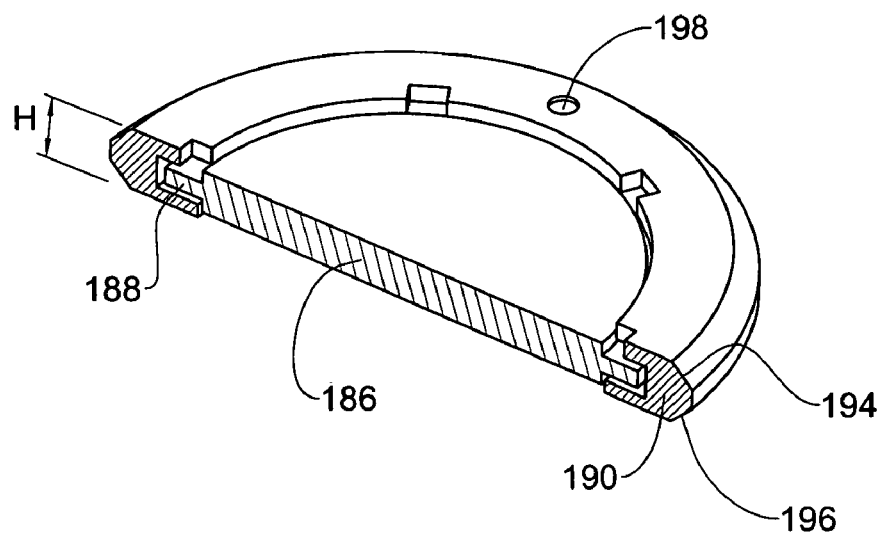
FIG. 5B is a cutaway of the subassembly of FIG. 5A fixed within a gripping device of a lens performing apparatus.

With reference being made now to FIGS. 5A and 5B, there is illustrated a lens blank 186 similar to lens blank 10 of FIG. 1A, having a disc-like shaped formed with an annular rim 188 radially projecting. The lens blank may be preformed with reference datum indications as discussed in connection with the embodiments of FIGS. 1A to 1C, and also with some pre-forming of the optical topography of the lens surfaces. However, according to the present embodiment, these are not requirements. Instead, the lens blank 186 is fixedly secured within an adapter ring 190 (e.g. by a locking ring, a bayonet-type engagement, adhering by various means such as wood alloy or other adhesive material, etc). However, it is appreciated that the lens blank material may be molded into the adapter ring.

In turn, the adapter ring 190 is pre-formed with such reference datum indications, which are, in the present example the height H of the adapter ring, the concentricity and tapering of sloping surfaces 194 and 196, one or more true position indications or some other discrete indications such as hole 198.

After securing the lens blank 186 to the adapter ring 190, the ring is secured to a gripping device 202 (FIG. 5A) where positioning of the lens blank is governed by the reference datum indications of the adapter ring 190 in combination with corresponding portions of the gripping device 202, e.g. matching engagement of inclined surface 196 with corresponding surface 206 of the gripping device, projection of a positioning pin 208 into the hole 198, etc. According to this arrangement, there is no need to form the lens blank with any reference datum indications as these are provided by the adapter ring. Even more so, the sub-assembly of the lens blank and the adapter ring may be moved between different workstations while retaining the reference datum.

FIGS. 6A–6D and 7A–7D are directed to a modified concept of the invention in accordance with the present invention. Referring first to FIGS. 6A to 6H, wherein pairs of figures illustrate consecutive steps of a method for manufacturing a lens each comprising a front isometric view and a rear isometric view. There are illustrated consecutive steps for obtaining a lens wherein at the first step (FIG. 6A and 6B) a lens blank generally designated 220 is obtained, said lens blank being integrally fitted with a blocking chuck 222 wherein only poor precision is required between an axis of the blank 220 and the chuck 222. The chuck 222 is typically molded of the same material as the blank 220, namely a polymeric material, etc.

Whilst gripping the blank 220 at the first chuck 222, a first face 228 of the lens is processed, e.g. by machining (FIGS. 6C and 6D). It is apparent that the first face 228 is in register with the first chuck 222. By using the term in register it is meant that the first chuck 222 may be coaxial with the blank 220 and extending on an axis normal to the first surface 222, although offset alignment or tilt may be deliberate, depending on optical parameters of the lens. It is preferred that at the step of FIGS. 6C and 6D the first face 228 of the lens be finished, though in accordance with a modification, the first face may be only partially processed wherein further processing and finishing will be required at a later stage as discussed in connection with previous embodiments.

At a next step, as illustrated in FIGS. 6E and 6F, a second chuck 230 is blocked to the first face 228 in full register with the first chuck 222. Such blocking in full register may be obtained in different ways, e.g. by using a device as disclosed hereinafter with reference to FIGS. 8A–8C. The chucks 222 and 230 are coaxial with one another though optical parameters of the lens may be obtained by blocking the second chuck 230 at a tilt with respect to the first chuck 222, or rotated with respect to one another.

At the next stage (FIGS. 6G and 6I) the lens blank 220 is gripped by the second chuck 230 and the first chuck 222 is machined off and further, the second face of the lens 234 is processed and may then be finished.

In some instances, the lens may be completed, and according to other instances, some other processes may be applied during the lens manufacturing or after. Examples of such processes are applying various marks to the lens (visible or non-visible marks), polishing, coating, edging (giving the lens its contour shape), etc.

Upon finishing the second face 234 the second chuck 230 is detached from the first face 228 as explained in connection with previous embodiments (e.g. by heating, by mechanical detaching, etc.) whereby the lens is complete.

According to the later embodiments, blocking the chucks in register with one another is carried out along with recordal of the kinematic parameters of the chucks, i.e. the absolute position of the chucks with respect to one another, to thereby facilitate further processing and machining of the lens e.g. by a CNC machine. Preferably, such parameters are digitally obtained and are used for use in conjunction with a CNC machine.

Turning now to the embodiment of FIGS. 7A–7D another embodiment of a method for obtaining a lens in accordance with the present invention is illustrated. At a first step (FIG. 7A) a lens blank 242 is obtained, without particular precision requirements regarding the first and second faces thereof. At a next step (FIG. 7B) a first chuck 244 is blocked to a first face 246 of the blank 242 again, without particular care regarding precision of concentricity and perpendicularity of the chuck 244 with respect to the blank 242. Then, a first face 248 of the lens is processed (FIG. 7C), e.g. by machining, preferably though not required to a complete polished surface. However, as already mentioned in connection with the previous embodiment, finishing of the first face 248 maybe accomplished at a later stage.

At the next stage (FIG. 7D) a second chuck 250 is blocked to the first face 248 of the lens whereupon the first chuck 244 maybe removed and the second face of the lens may be processed up to polishing and finishing thereof to obtain a complete lens upon removal of the second chuck 250.

Figure 8A:
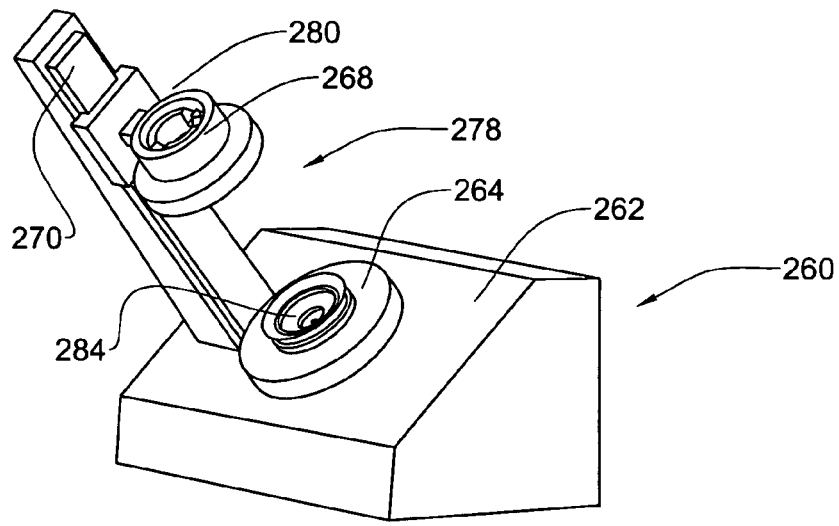
FIGS. 8A to 8c are isometric views of an apparatus for chuck-to-chuck orientation during a blocking process, in two respective positions, used for two applications.
Figure 8B:
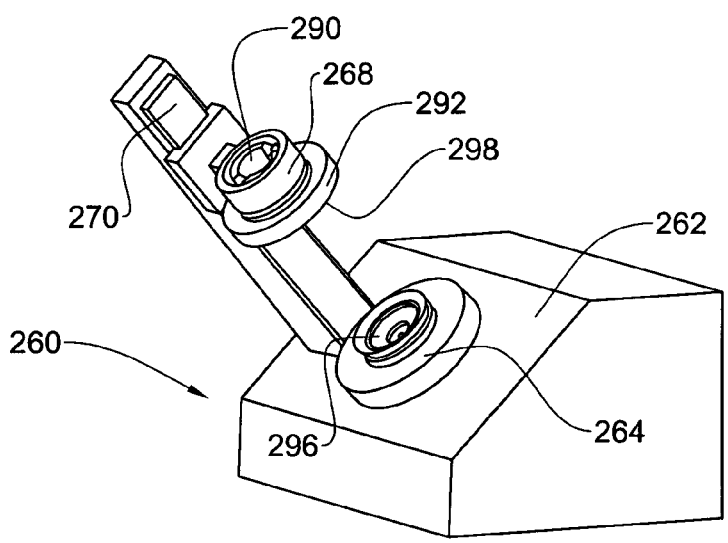
Figure 8C:
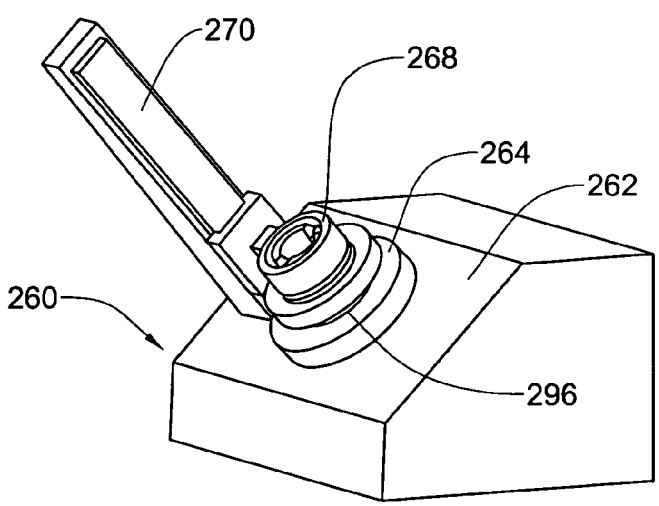

FIGS. 8A–8C are directed to an apparatus generally designated 260 suited for chuck-to-chuck orientation during a blocking procedure. The apparatus comprises a work surface 262 fitted with a chuck gripper in the form of a concentric positioning bed 264. A second chuck gripper 268 is slidably mounted on a rail 270, e.g. by a dovetail engagement etc., whereby the first gripper and the second gripper are in axial alignment, i.e. coaxial with one another and preferably with no degree of freedom apart from the axial displacement of the second chuck gripper 268. However, it is appreciated that in accordance with modifications, one or both of the grippers may be fitted with a tilt and/or a rotation control mechanism.

The apparatus in FIG. 8A is illustrated in its open position wherein the second gripper 268 is gripping a lens blank 278 integrally fitted with a chuck 280, in accordance with the embodiment illustrated in FIGS. 6C and 6D, i.e., after processing a first face of the lens (228 in FIG. 6C) wherein it is now required to block a second chuck 284 to the first chuck, as per FIGS. 6E and 6F.

The embodiment of FIG. 8B illustrates the apparatus in an open position wherein the second gripper 268 grips a lens blank in accordance with the embodiment of FIG. 7C, i.e., where a blocker chuck 290 is blocked to the lens blank 292 and whereupon a second blocker chuck 296 is to be blocked to a first processed face 298 of the lens, as per FIG. 7D.

FIG. 8C illustrates the so-called closed or blocking position wherein the second gripper 268 is lowered towards the first gripper 264 to accomplish blocking of a second gripper.

Whilst several embodiments have been shown and described, it is to be understood that it is not intended thereby to limit the disclosure, but rather it is intended to cover all embodiments, modifications and arrangements falling within the spirit and the scope of the present invention, as defined in the appended claims, mutatis mutandis.

The invention claimed is:

1. A method for processing a lens blank provided with a first surface and a second surface to be processed by a processing equipment for imparting the first and the second surface with required surface topography and obtaining a corresponding first optical face and a second optical face of a lens, said method comprises positioning the lens blank in a gripping device and gripping the lens blank by a gripping device while relying on reference datum indications enabling orientation of the lens blank to obtain the required surface topography of both optical faces of the lens, and wherein not more than one reference datum indication extends on the first optical face of the lens.

2. A method according to claim 1, wherein all reference datum indications are formed on peripheral portions of the lens blank.

3. A method according to claim 1, wherein optical faces of the lens are not formed with any reference datum indications.

4. A method according to claim 1, wherein the reference datum indications are preformed on the lens blank.

5. A method according to claim 1, wherein the reference datum indications are formed on the lens blank during processing of the lens, prior to processing the second optical face thereof.

6. A method according to claim 1, wherein orientation of the lens during its processing is entirely mechanical.

7. A method according to claim 1, wherein blocking and gripping the lens blank during its processing are entirely mechanical.

8. A method according to claim 1, wherein the gripping device is integral with or attachable to the lens processing equipment.

9. A method according to claim 4, wherein orientation of the lens blank is achieved by a set of full-spatial reference datum indications provided on the lens blank, indicative of the orientation of the lens blank, wherein said indications are not formed on the first or second optical face of the lens.

10. A method for processing a first optical face and a second optical face of a lens, where the lens blank is positioned and gripped by a gripping device relying on reference datum indications rendering it possible to obtain topographic orientation for processing both faces of the lens, and wherein not more than one reference datum indication extends on a face of the lens, wherein the reference datum indications are provided by an adapter assembly wherein the lens blank is received by a first component adapted for engagement with a second component associated with the gripping device; wherein said first component and said second component are formed with corresponding reference datum engagement portions.

11. A method for processing optical faces of a lens, comprising the following steps:
(a) Providing a lens blank having a first surface and a second surface to be processed by a processing equipment for imparting the first and the second surface with required surface topography and obtaining a corresponding first optical face and a second optical face of a lens;
(b) Gripping the lens blank by a gripping device for use in conjunction with a lens processing machine;
(c) Processing the lens blank to obtain full-spatial reference datum indications and processing the first surface of the lens whereby said reference datum indications define the coordinates of the lens with respect to the first optical face; and wherein not more than one of the reference datum indications extends on the first optical face of the lens;
(d) Turning over the lens blank and gripping it while relying on said reference datum indications; and
(e) Processing the second optical face of the lens.

12. A method according to claim 11, wherein before step (d) the surface of the first optical face is finished.

13. A method for processing optical faces of a lens, comprising the following steps:
(a) Obtaining a lens blank;
(b) Gripping the lens blank by a gripping device for use in conjunction with a lens processing machine;
(c) Processing the lens blank to obtain full-spatial reference datum indications and processing a first optical face of the lens whereby said reference datum indications define the coordinates of the lens with respect to said first optical face; and wherein not more then one reference datum indication extends on the optical face of the lens;
(d) Turning over the lens blank and gripping it while relying on said reference datum indications; and
(e) Processing a second optical face of the lens;
wherein before step (d), a removable structural support material is applied into a cavity formed adjacent the first optical face, to thereby facilitate processing the second optical lens face.

14. A method according to claim 13, wherein the surface of the first optical face is coated with a protective material prior to applying the structural support material.

15. A method for processing optical faces of a lens, comprising the following steps:
(a) Obtaining a lens blank;
(b) Gripping the lens blank by a gripping device for use in conjunction with a lens processing machine;
(c) Processing the lens blank to obtain full-spatial reference datum indications and processing a first optical face of the lens whereby said reference datum indications define the coordinates of the lens with respect to said first optical face; and wherein not more then one reference datum indication extends on the optical face of the lens;
(d) Turning over the lens blank and gripping it while relying on said reference datum indications; and
(e) Processing a second optical face of the lens;
wherein before step (c), the first surface of the lens is formed with an anchoring arrangement to increase attachment of the structural support material to the lens blank.

16. A method according to claim 15, wherein the anchoring arrangement is a peripheral recess.

17. A method for processing optical faces of a lens, comprising the following steps:
(a) Providing a lens blank having a first surface and a second surface to be processed by a processing equipment for imparting the first and the second surface with required surface topography and obtaining a corresponding first optical face and a second optical face of a lens;
(b) Gripping the lens blank by a gripping device for use in conjunction with a lens production machine;
(c) Processing the lens blank to obtain full-spatial reference datum indications and processing the first optical face of the lens whereby said reference datum indications define the coordinates of the lens with respect to the first optical face; and wherein not more than one reference datum indication extends on the first optical face of the lens;
(d) Blocking the first optical face of the lens to a blocking chuck, where reference datum indications of the blocking chuck are in register with the reference datum indications of the lens blank;
(e) Gripping the blocking chuck by the gripping device; and
(f) Processing the second optical face of the lens.

18. A method according to claim 17, wherein after step (c) the first optical face of the lens is finished.

19. A method according to claim 17, wherein the blocking chuck is a mobile device pre-formed with full-spatial mechanical true-position reference datum indications.

20. A method according to claim 17, wherein the blocking chuck is formed with full-spatial mechanical datum indications and one optical true-position reference datum indication.

21. A method according to claim 20, wherein orientation of the blocking chuck with reference to the lens blank is based on a combination of mechanical and optical reference datum indications.

22. A method according to claim 17, wherein one or both of the first optical face and the second optical face are finished at a later step.

23. A method for processing optical faces of a lens, comprising the following steps:
(a) Obtaining a lens blank;
(b) Gripping the lens blank by a gripping device for use in conjunction with a lens production machine;
(c) Processing the lens blank to obtain full-spatial reference datum indications and processing a first optical face of the lens whereby said reference datum indications define the coordinates of the lens with respect to said first optical face; and wherein not more then one reference datum indication extends on the first optical face of the lens;
(d) Blocking the first optical face of the lens to a blocking chuck, where reference datum indications of the blocking chuck are in register with the reference datum indications of the lens
(e) Gripping the blocking chuck by the gripping device; and
(f) Processing a second optical face of the lens.
wherein after step (c) a removable structural support material is applied into a cavity formed adjacent said first optical face, to thereby facilitate processing the second optical face.

24. A method for processing optical faces of a lens, comprising the following steps:
(a) Obtaining a lens blank pre-formed with reference datum indications providing full-spatial reference datum indications sufficient for processing a first optical face and a second optical face of the lens;
(b) Gripping the lens blank by a gripping device for use in conjunction with a lens production apparatus and processing the first optical face of the lens relying on said reference datum indications; wherein not more than one reference datum indication extends on an optical surface of the lens;
(c) Turning over the lens blank and gripping it while relying on said reference datum indications; and
(d) Processing the second optical face of the lens.

25. A method for processing optical faces of a lens, comprising the following steps:
(a) Obtaining a lens blank pre-formed with reference datum indication providing full-spatial reference datum indications sufficient for processing a first optical face and a second optical face of the lens;
(b) Gripping the lens blank by a gripping device for use in conjunction with a lens production apparatus and processing the first optical face of the lens relying on said reference datum indications; wherein not more than one reference datum indication extends on an optical surface of the lens
(c) Blocking the first optical face of the lens to a blocking chuck, where reference datum indications of the blocking chuck are in register with the reference datum indications of the lens blank;
(d) Gripping the blocking chuck by a gripping device for use in conjunction with a lens production apparatus; and
(e) Processing the second optical face of the lens.

26. A method for processing optical faces of a lens, comprising the following steps:
(a) Obtaining a lens blank;
(b) Gripping the lens blank by a gripping device for use in conjunction with a lens production machine;
(c) Processing the lens blank to obtain full-spatial reference datum indications and processing a first optical face of the lens whereby said reference datum indications define the coordinates of the lens with respect to said first optical face; and wherein not more then one reference datum indication extends on the first optical face of the lens;
(d) Blocking the first optical face of the lens to a blocking chuck, where reference datum indications of the blocking chuck are in register with the reference datum indications of the lens blank;
(e) Gripping the blocking chuck by the gripping device; and
(f) Processing a second optical face of the lens,
wherein before step (d), a removable structural support material is applied into a cavity formed adjoining said first optical face, to thereby facilitate processing the second lens face.

27. A method for processing optical faces of a lens, comprising the following steps:
(a) Obtaining a lens blank pre-formed with reference datum indications providing full-spatial reference datum indications sufficient for processing a first optical face and a second optical face of the lens;
(b) Gripping the lens blank by a gripping device for use in conjunction with a lens production apparatus and processing the first optical face of the lens relying on said reference datum indications; wherein not more than one reference datum indication extends on an optical surface of the lens;

(c) Turning over the lens blank and gripping it while relying on said reference datum indications; and
(d) Processing the second optical face of the lens,
wherein before step (d), a removable structural support material is applied into a cavity formed adjoining said first optical face, to thereby facilitate processing the second lens face.

28. A method for processing optical faces of a lens, comprising the following steps:
(a) Obtaining a lens blank pre-formed with reference datum indication providing full-spatial reference datum indications sufficient for processing a first optical face and a second optical face of the lens;
(b) Gripping the lens blank by a gripping device for use in conjunction with a lens production apparatus and processing the first optical face of the lens relying on said reference datum indications; wherein not more than one reference datum indication extends on an optical surface of the lens
(c) Blocking the first optical face of the lens to a blocking chuck, where reference datum indications of the blocking chuck are in register with the reference datum indications of the lens blank;
(d) Gripping the blocking chuck by a gripping device for use in conjunction with a lens production apparatus; and
(e) Processing the second optical face of the lens;
wherein before step (d), a removable structural support material is applied into a cavity formed adjoining said first optical face, to thereby facilitate processing the second lens face.

* * * * *